UNITED STATES PATENT OFFICE.

HENRY KNIGHT, OF LIVERPOOL, ENGLAND, ASSIGNOR TO THOMAS GRIFFITHS, OF SAME PLACE.

IMPROVEMENT IN THE MANUFACTURE OF WHITE PIGMENTS.

Specification forming part of Letters Patent No. 212,016, dated February 4, 1879; application filed July 30, 1877.

*To all whom it may concern:*

Be it known that I, HENRY KNIGHT, of Liverpool, in the county of Lancaster, England, have invented an Improved Method or Process of Manufacturing Pigments, of which the following is a specification:

My invention consists of an improved method or process of manufacturing white pigments, not claiming the separate steps of the chemical process, all of which will be fully understood by the following description.

First. Take a solution of chloride of zinc and add thereto a solution of sulphide of calcium until precipitation ceases, or nearly so; then filter out the precipitate and preserve the same, calling it "Precipitate No. 1."

The sulphide of calcium is a red liquor, and may be made, in the usual way, by boiling together lime and sulphur, and the chloride of zinc may be made by dissolving scrap zinc in commercial hydrochloric acid—say about seven parts of zinc to fifteen parts, by weight, of acid.

Second. Take a strong solution of chloride of barium, and treat the same with a solution of sulphate of magnesia. Filter out the precipitate, being sulphate of baryta, and preserve the same as Precipitate No. 2.

The sulphate of magnesia may be best obtained from native sulphate of magnesia, which is abundant in Germany at five dollars per ton; and the chloride of barium may be made from carbonate of baryta, using, say, carbonate of baryta, twenty parts; chlorhydric acid, twenty parts.

Third. Treat the filtrate or mother-liquor (magnesium chloride) remaining after the last step with a solution of carbonate, or, better, bicarbonate, of soda, and filter out the resulting precipitate, being carbonate of magnesia, and preserve the same as Precipitate No. 3.

In the last precipitation use about twenty parts of bicarbonate of soda, and to facilitate the process the volumetric method may be employed by using a graduated or measured glass or vessel, as is well known.

Now take the above three precipitates numbered 1, 2, and 3, and mix the same well together in the proportions described, and calcine the mixture at dull-red heat. The calcined mixture is afterward thoroughly ground, and then levigated, thus forming my improved pigment.

I do not claim, individually, the separate steps of the process; but,

Having thus described my invention, what I claim is—

The process of making a white color or pigment from the mixture of zinc sulphide, barium sulphide, and magnesium oxide by the artificial preparation and calcination of these salts, as described.

HENRY KNIGHT.

Witnesses:
WM. P. THOMPSON,
W. M. EDWARDS.